US006856926B2

(12) United States Patent
Monfared et al.

(10) Patent No.: US 6,856,926 B2
(45) Date of Patent: *Feb. 15, 2005

(54) FREQUENCY MARGIN TESTING OF BLADED SERVERS

(75) Inventors: Akbar Monfared, Placerville, CA (US); Steve Mastoris, El Dorado Hills, CA (US); Rex Schrader, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 82 days.

This patent is subject to a terminal disclaimer.

(21) Appl. No.: 10/378,238

(22) Filed: Mar. 3, 2003

(65) Prior Publication Data

US 2004/0176920 A1 Sep. 9, 2004

(51) Int. Cl.[7] ............................................... G06F 19/00
(52) U.S. Cl. ..................... 702/75; 702/75; 702/76; 702/85; 702/106; 702/124; 324/520; 324/76.19; 327/50; 327/306; 708/311; 708/309; 709/223; 709/224; 713/400; 713/501
(58) Field of Search ............................ 702/71, 75, 76, 702/85, 106, 124, 182, 189; 324/520, 76.19; 327/50, 306; 708/311, 310; 709/223, 224; 713/400, 501

(56) References Cited

U.S. PATENT DOCUMENTS

| 4,490,821 | A | * | 12/1984 | Lacher | ........................ | 714/700 |
| 5,486,753 | A | * | 1/1996 | Khazam et al. | ............. | 324/72.5 |
| 6,484,124 | B1 | * | 11/2002 | MacMullen | .................. | 702/182 |
| 6,535,986 | B1 | * | 3/2003 | Rosno et al. | ................ | 713/400 |
| 2003/0188222 | A1 | * | 10/2003 | Abbondanzio et al. | ........ | 714/12 |
| 2004/0034486 | A1 | * | 2/2004 | Iannuzzi | ....................... | 702/66 |

OTHER PUBLICATIONS

Hewlett–Packard Company, HP Manageability Solution Brief: HP Blade Server Environment, Apr. 2002.

Hewlett–Packard Company, HP Blade Server Data Sheet, Dec. 2001.

* cited by examiner

Primary Examiner—Marc S. Hoff
Assistant Examiner—Elias Desta

(57) ABSTRACT

A frequency margin testing blade is adapted for use in a bladed server. The testing blade is further adapted to provide one or more output clock signals for use as clock inputs to one or more server blades internal to the bladed server in which the testing blade is installed and/or one or more server blades external to the bladed server in which the testing blade is installed.

44 Claims, 4 Drawing Sheets

FREQUENCY MARGIN TESTING OF BLADED SERVERS

FIELD OF THE INVENTION

The present invention relates generally to frequency margin testing.

BACKGROUND

Bladed servers are comprehensive computing systems that include processors, memory, network connections and associated electronics, all on a single motherboard called a blade. This high-density technology addresses the current trend among large computing centers to reduce space requirements while lowering their total cost of ownership. A server blade, along with storage, networking and other blades, are typically installed in a rack-mountable enclosure that houses multiple blades that share common resources such a cabling, power supplies and cooling fans.

In the design and manufacture of electronic components, it is common to perform testing to help detect or identify material, process and design weaknesses of the components. Such testing is desirable as it helps ensure the delivery of high-quality and reliable products to the end consumer.

One common test is frequency margin testing of the CPU (central processing unit) or bus (also referred to as runway) clock inputs. A component may work satisfactorily at nominal clock frequencies, but a dip or rise in the frequency or amplitude may cause a marginal component to fail. Such dips or rises are a part of normal operating conditions due to such factors as electromagnetic interference or line noise, drift or loss of reference clocks, or variations in components.

Frequency margin testing is generally accomplished using automated tester equipment to provide a variable external clock input. Often, these stationary testers are expensive, with some as much as $40,000 each. Additionally, such stationary testers are generally impracticable in the field.

For the reasons stated above, and for other reasons stated below that will become apparent to those skilled in the art upon reading and understanding the present specification, there is a need in the art for alternative apparatus and methods for frequency margin testing of bladed servers.

SUMMARY

The various embodiments described herein facilitate frequency margin testing, particularly in bladed servers. The various embodiments facilitate such testing by providing a frequency margin testing blade adapted for use in a bladed server having at least one server blade. The testing blade is further adapted to provide one or more output clock signals for use as clock inputs to one or more server blades internal to the bladed server in which the testing blade is installed and/or one or more server blades external to the bladed server in which the testing blade is installed.

Embodiments of the invention include apparatus and methods of varying scope.

DESCRIPTION OF PREFERRED EMBODIMENTS

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

The various embodiments include apparatus and methods for frequency margin testing of bladed servers and their various components. Such testing is facilitated using a frequency margin blade or testing blade in accordance with an embodiment of the invention. The testing blades of various embodiments utilize substantially the same form factor as other blades of the bladed server, i.e., the testing blades of the various embodiments may be inserted in an available slot of the bladed server or may be swapped with a non-essential blade of the bladed server if there are no available slots. An example of a standard form factor utilized in bladed systems includes the cPCI (compact Peripheral Component Interconnect) form factor. This is one industry-standard for the connection and communication of computer devices. These standards often specify bus communication protocols as well as physical connectivity and pin layout for the various power supplies and signal types.

Figure 1:
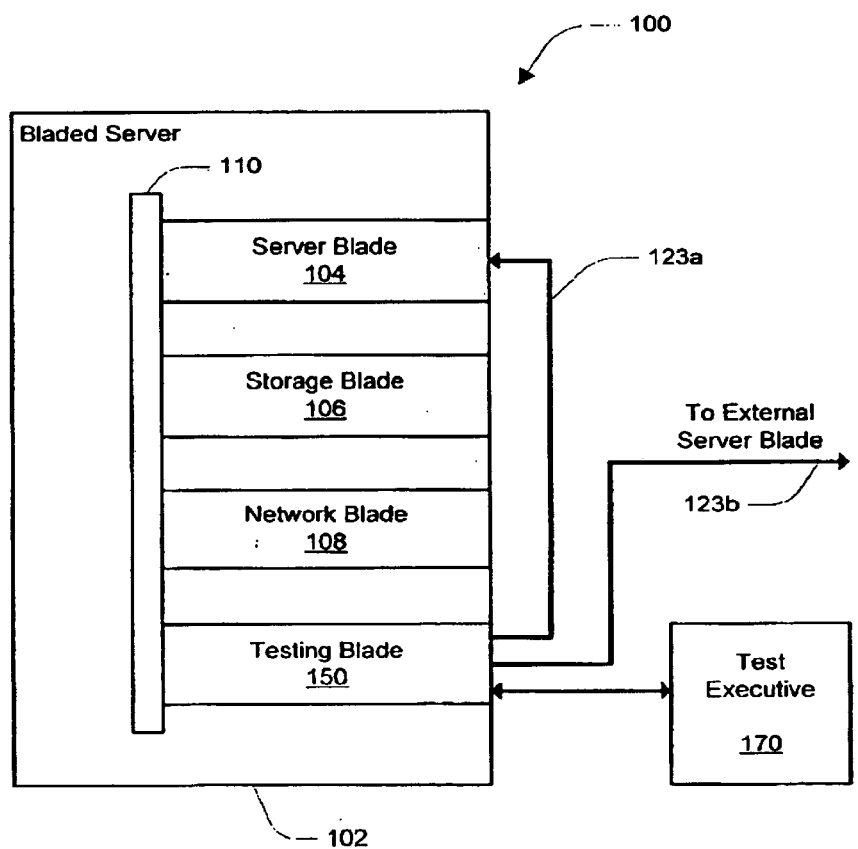
FIG. 1 is a block diagram of a bladed server in accordance with an embodiment of the invention.

FIG. 1 is a block diagram of a bladed server 100 in accordance with an embodiment of the invention. The bladed server 100 includes a chassis 102 housing at least one server blade 104 to provide server functionality. The bladed server 100 further typically includes one or more storage blades 106 for storage of data or other information and at least one network blade 108 for communication of the bladed server 100 across a computer network, such as a local area network (LAN) or wide area network (WAN). The bladed server 100 further includes a testing blade 150 in accordance with an embodiment of the invention. The testing blade 150 may be permanently installed in the bladed server 100. However, it is contemplated that the testing blade 150 will be more advantageous as a portable device In this manner, one testing blade 150 may be used to individually test multiple bladed servers.

Each blade of the bladed server 100 is coupled to a backplane 110. The backplane 110 may be referred to as a midplane depending upon the location of the backplane 110 to the orientation of the blades, i.e., whether it is located opposite or adjacent a bulkhead of the blades. However, for consistency, the term backplane will be used herein regardless of its location relative to the orientation of the blades. The backplane 110 provides communication channels and power inputs for each of the blades of the bladed server 100.

For frequency margin testing, the testing blade 150 is coupled to a test executive 170. A test executive is typically an application for automated sequencing of test programs. These test programs typically provide a user interface for the testing process, log test data and determine whether a particular test has passed or failed. However, the test executive 170 may represent a user interface for manual input to the testing blade 150.

The test executive 170 may be capable or adapted to perform testing other than frequency margin testing involving the testing blade 150. As such, it is preferred that the testing blade 150 pass commands and data from the test executive 170 to other blades of the bladed server 100 unaltered until the test executive 170 invokes the testing blade 150. Invoking the testing blade 150 can be through a special escape sequence or other data pattern that signals the testing blade 150 that frequency margin testing is desired. This escape sequence should not be passed through to other blades.

One or more output clock signals 123$a$, 123$b$ are generated by the testing blade 150. The output clock signals may be provided to one or more of a server blade 104 of the chassis 102 containing the testing blade 150, e.g., clock signal 123$a$, or of an external server blade (not shown), such as a server blade 104 of another chassis 102, e.g., clock signal 123$b$.

Figure 2:
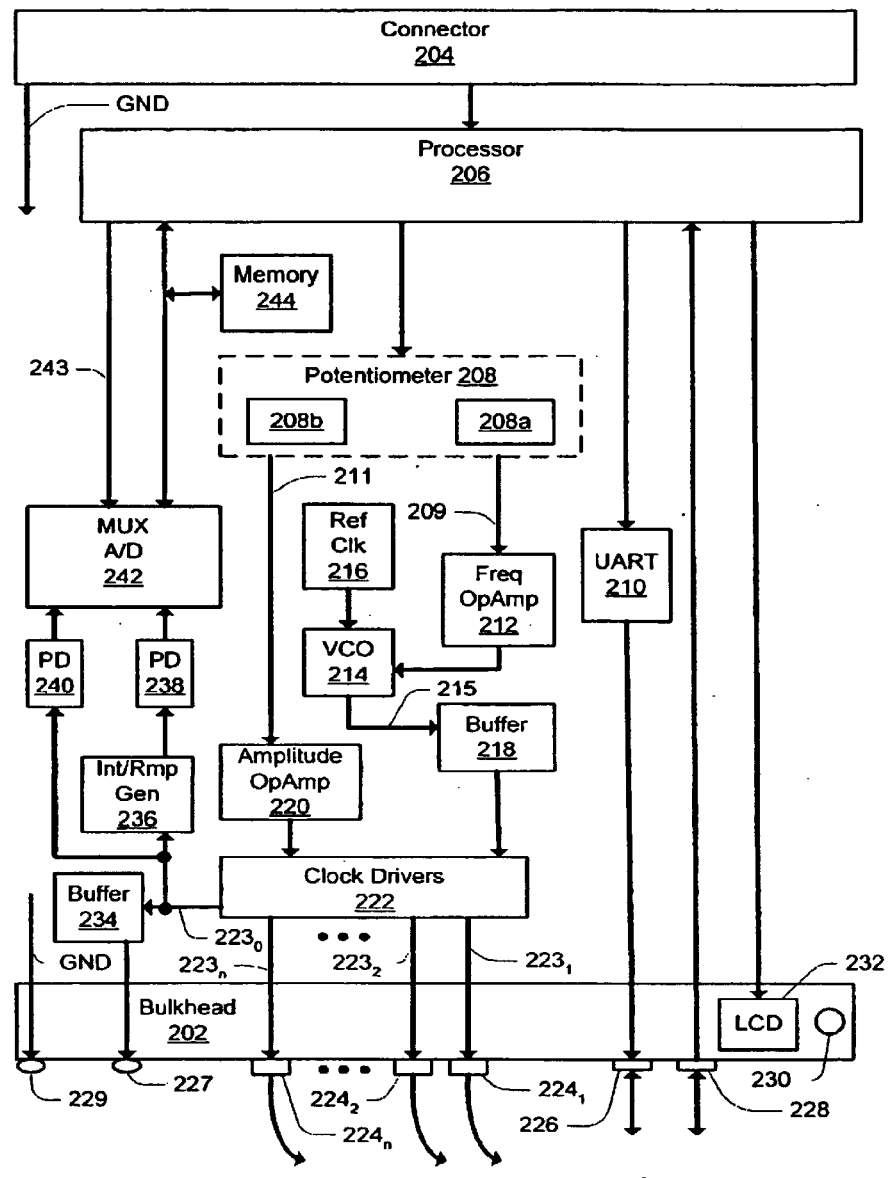
FIG. 2 is a functional block diagram of a frequency margin testing blade in accordance with an embodiment of the invention.

FIG. 2 is functional block schematic of a testing blade 250 in accordance with an embodiment of the invention. The testing blade 250 includes a faceplate or bulkhead 202 as a signal interface and a connector 204 for coupling to a communication bus or backplane. The bulkhead 202 for most blades typically includes status indicators. These status indicators are often in the form of LEDs (light-emitting diodes) providing state indication, e.g., active, disconnected, failed, etc., or LCDs (liquid crystal displays) providing alphanumeric, graphical or other indications, e.g., error codes, analog readings, histograms or text messages. For one embodiment, the testing blade 250 includes an LED indicator 230 and an LCD indicator 232.

The testing blade 250 further includes a microcontroller unit or processor 206, coupled to the connector 204, for controlling the operation of the testing blade 250. Some communications from the processor 206 may pass through a UART (universal asynchronous receiver/transmitter) 210 for providing asynchronous data at a data output 226 of the bulkhead 202. The data output 226 may be used for communication with other blades of a bladed server. A data input 228 of the bulkhead 202 may be used for commands and data from a test executive or other user interface. A memory 244 may be used to store commands and data values, such as discrete desired clock characteristics, such as frequencies and amplitudes, or data used to derive the desired clock characteristics, such as an initial value, an end value and an increment value or ramp rate. Access port 229 may be provided to externally sample a ground potential used by the testing blade 250.

For the embodiment depicted in FIG. 2, one or more clock signals 223 are generated in response to a desired frequency and, optionally, a desired amplitude received at the testing blade 250. The desired frequency and amplitude may be received from a test executive or other user interface, and stored in the memory 244. One or more of the clock signals 223, e.g., $223_1$–$223_n$, may be provided through ports $224_1$–$224_n$, respectively, for use as clock inputs to a device (not shown in FIG. 2) to be tested, such as a clock input to a server blade. These clock signals 223 may, for example, be provided to one or more server blades of a bladed server containing the testing blade 250 as well as one or more server blades of other bladed servers. An additional clock signal 223, e.g., $223_0$, may be utilized as a feedback signal for control of the clock signals 223 at or near desired frequency and amplitude. The clock signal $223_0$ or another one of the clock signals 223 may also be provided to an access port 227 through a buffer 234 for direct sampling by a user. Each of the clock signals $223_0$–$223_n$ should have substantially the same characteristics of frequency and amplitude. Accordingly, they may be deemed to be a single clock signal 223 split to multiple locations.

For one embodiment, the clock signal $223_0$ is compared against the desired frequency and amplitude by first generating values indicative of the frequency and amplitude of the sensed clock signal $223_0$. For example, the clock signal $223_0$ may be provided to an integrator/ramp generator 236 and a peak detector 238 in series for generating an analog signal, e.g., a voltage signal, indicative of the frequency of the clock signal $223_0$. In addition, the clock signal $223_0$ may be provided to a peak detector 240 for generating an analog signal indicative of the amplitude of the clock signal $223_0$.

These analog signals may then be converted to digital signals, such as by an analog-to-digital converter 242, for use by a processor 206. The analog-to-digital converter 242 may further be multiplexed for converting a selected one of the analog signals into a corresponding digital signal for use by the processor 206 in response to a channel select signal 243. Alternatively, a dedicated analog-to-digital converter 242 may be provided for each analog signal. The resulting digital signals are indicative of the frequency and amplitude of the output clock signals 223.

The digital signals or values representative of the frequency and amplitude of the clock signals 223 are provided to the processor 206 for comparison to the desired clock signal characteristics. The processor 206 generates a control signal, for each characteristic of the clock signals 223, indicative of any desire to modify that characteristic. For example, if the comparison indicated that the sensed frequency was less than the desired frequency, the processor 206 would generate a control signal indicative of a desire to increase the frequency of the clock signals 223. It is noted that the control signal indicative of a desire to modify a characteristic may indicate that no modification is required.

For one embodiment, a potentiometer 208 provides a first control signal 209 in response to input received from the processor 206. The first control signal 209 is indicative of any desire to modify the frequency of the clock signals 223. The first control signal 219 is provided to a first OpAmp (operational amplifier), such as frequency OpAmp 212, for use in controlling the frequency of the output clock signals 223. The potentiometer 208 is preferably a digital potentiometer for receiving a digital control signal from the processor 206 and providing a variable voltage output.

The output of the OpAmp 212 is provided to an oscillator, such as the voltage-controlled oscillator (VCO) 214, for generation of an intermediate clock signal 215 having a frequency. The OpAmp 212 provides signal isolation and current sourcing between the potentiometer 208 and the VCO 214. The output of the VCO 214 may be passed through a buffer 218 for signal isolation and provided to a clock driver 222 for control of the frequency output of the clock driver 222. The output of the VCO 214 may be synchronized with a reference clock 216.

The potentiometer 208, also in response to the comparison of the characteristics of the sensed clock signal 223 to the desired characteristics, further provides a second control signal 211 for control of the amplitude of the output clock signals 223. The second control signal 211 may be passed through a second OpAmp, such as amplitude OpAmp 220, for signal isolation and current sourcing. The second control signal 211 is then provided to the clock driver 222 for control of the gain of the clock driver 222, and hence the amplitude of the resulting clock signals 223.

As depicted in FIG. 2, the potentiometer 208 includes a first potentiometer 208a for generating the first control signal for controlling the output clock signal frequency and a second potentiometer 208b for generating the second control signal for controlling the output clock signal amplitude. For another embodiment, the oscillator for generating the intermediate clock signal 215 may be a numerically controlled oscillator (NCO). While VCOs rely on a voltage signal as their control signal, NCOs utilize a digital signal. Thus, using an NCO as the oscillator would permit variation of the intermediate clock signal 215 directly by the processor 206 without a digital-to-analog conversion.

The clock driver 222 generates the output clock signals 223 in response to the intermediate clock signal 215 and, optionally, the amplitude control signal 211. A clock driver transforms an input clock signal into an output clock signal having appropriate voltages, or amplitude, for a target receiving device. A clock driver thus provides an output clock signal having the frequency characteristics of an input clock signal, such as the intermediate clock signal 215, adjusted by some gain factor, such as in response to the amplitude control signal 211. The clock driver 222 should thus be chosen to provide an appropriate output clock signal for the desired target devices, such as server blades. For one embodiment, the amplitude of the output clock signals 223 is substantially constant, thus not requiring an amplitude control signal 211.

Figure 3:
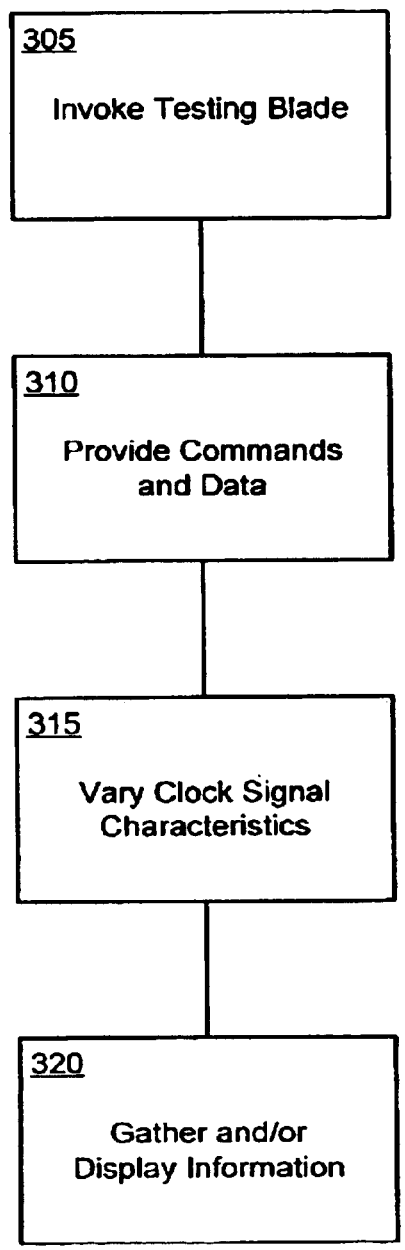
FIG. 3 is a flowchart of one embodiment of operating a bladed server.

FIG. 3 is a flowchart showing testing of a bladed server in accordance with an embodiment of the invention. At 305, the test executive invokes the testing blade. For one embodiment, this involves sending an escape sequence to a data input of the testing blade. At 310, commands and data are provided to the testing blade from the test executive to instruct the testing blade to adjust the frequency and, optionally, the amplitude of the output clock signals for testing of the bladed server or individual server blades at operating clock characteristics that are lower or higher than nominal conditions. While it is possible to manually provide data and commands to the testing blade such that a user or administrator acts as the test executive, it is preferred that the test executive be automated to sequence the testing blade through a variety of operating conditions without further user interaction.

At 315, the testing blade varies the characteristics of the output clock signal in response to the data and commands provided by the test executive. A typical test sequence might be to vary the output clock signal from −10% of nominal to +10% of nominal, such as by 1% increments. In general, the testing blade generates an output clock signal having a frequency and an amplitude. For varying the frequency of the output clock signal, the frequency is sensed and a value indicative of the frequency is generated. This value is then compared to a value indicative of the desired frequency. Based on this comparison, the frequency of the output clock signal is then modified as necessary. For varying the amplitude of the output clock signal, the amplitude is sensed and a value indicative of the amplitude is generated. This value is then compared to a value indicative of the desired amplitude. Based on this comparison, the amplitude of the output clock signal is then modified as necessary.

At 320, the testing blade gathers and/or displays information related to the operation of the bladed server at the various clock signal characteristics, such as measured operating conditions, desired settings, any error or status codes generated by the blades, etc. By adjusting the clock signal characteristics provided to one or more server blades, operation at marginal conditions may assist in identifying and exposing latent failures of the bladed server's components. In addition, during design phases, such testing can provide guidance on component selection to facilitate improvements in device quality and reliability.

Figure 4:
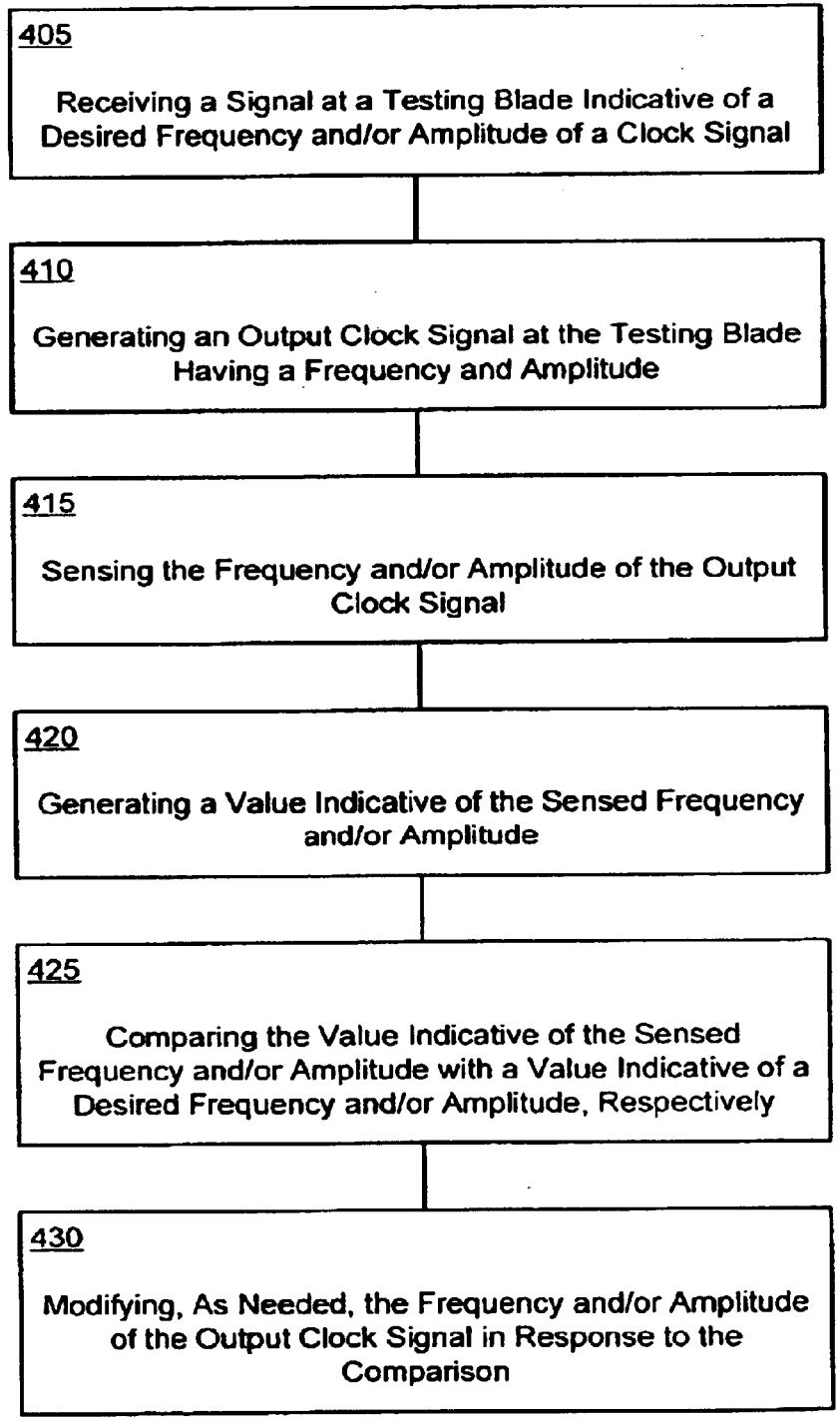
FIG. 4 is a flowchart of a further embodiment of operating a bladed server.

FIG. 4 is a flowchart showing testing of a bladed server in accordance with a further embodiment of the invention. At 405 a signal is received at the testing blade indicative of a desired frequency and/or amplitude of a clock signal. The signal is indicative of a desired frequency of a clock signal for use by the bladed server that is different than a nominal clock signal frequency for use by the bladed server. The desired amplitude of the clock signal for use by the bladed server may also be different than a nominal clock signal amplitude for use by the bladed server. At 410, an output clock signal is generated at the testing blade. The clock signal will have a frequency and an amplitude.

At 415, the frequency and/or amplitude of the output clock signal is sensed. In response to the sensing of the frequency and/or amplitude, a value indicative of the sensed frequency and/or amplitude, respectively, is generated. At 425, the value indicative of the sensed frequency and/or the value indicative of the sensed amplitude are compared with a value indicative of a desired frequency and/or a value indicative of a desired amplitude, respectively. At 430, the frequency and/or amplitude of the output clock signal is then modified, as needed, in response to the comparison.

A frequency margin testing blade is adapted for use in a bladed server. The testing blade is further adapted to provide one or more output clock signals for use as clock inputs to one or more server blades internal to the bladed server in which the testing blade is installed and/or one or more server blades external to the bladed server in which the testing blade is installed.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A frequency margin testing blade, comprising:

means for coupling the testing blade to a backplane of a bladed server;

means for generating a clock signal having a frequency;

means for providing the clock signal to an external device;

means for sensing the frequency of the clock signal;

means for comparing the frequency sensed by the means for sensing the frequency of the clock signal with a value indicative of a desired frequency; and means for modifying the frequency of the clock signal if the frequency sensed by the means for sensing the frequency of the clock signal differs from the desired frequency.

2. The testing blade of claim 1, further comprising:

means for sensing an amplitude of the clock signal;

means for comparing the amplitude sensed by the means for sensing the amplitude of the clock signal with a value indicative of a desired amplitude; and means for modifying the amplitude of the clock signal if the amplitude sensed by the means for sensing the amplitude of the clock signal differs from the desired amplitude.

3. The testing blade of claim 1, wherein the means for coupling further comprises an industry-standard form factor for the connection and communication of computer devices.

4. The testing blade of claim 1, wherein the industry-standard form factor is a compact PCI connector.

5. A testing blade for a bladed server, comprising:
a connector adapted for coupling to a backplane of the bladed server;
an oscillator for generating a first clock signal in response to a frequency control signal;
a clock driver for generating at least two second clock signals in response to the first clock signal, the at least two second clock signals having a frequency;
a processor in communication with the connector and adapted to compare a value indicative of the frequency of the at least two second clock signals with a value indicative of a desired frequency, wherein the processor is further adapted to generate a first control signal indicative of a desire to modify the frequency of the at least two second clock signals in response to the comparison; and
at least one port for providing one or more of the at least two second clock signals to external devices to be tested;
wherein the frequency control signal is responsive to the first control signal.

6. The testing blade of claim 5, wherein the oscillator is a voltage-controlled oscillator and wherein the frequency control signal is an output of a potentiometer and is generated in response to the first control signal as an input of the potentiometer.

7. The testing blade of claim 6, further comprising wherein the output of the potentiometer is provided to an OpAmp to generate the frequency control signal.

8. The testing blade of claim 5, wherein the oscillator is a numerically-controlled oscillator and the frequency control signal is the first control signal.

9. The testing blade of claim 5, further comprising:
wherein the processor is further adapted to compare a value indicative of an amplitude of the at least two second clock signals with a value indicative of a desired amplitude;
wherein the processor is further adapted to generate a second control signal indicative of a desire to modify the amplitude of the at least two second clock signals in response to the comparison; and
wherein the clock driver is adapted to adjust the amplitude of the at least two second clock signals in response to an amplitude control signal responsive to the second control signal.

10. The testing blade of claim 9, wherein the amplitude control signal is an output of a potentiometer and is generated in response to the second control signal as an input of the potentiometer.

11. The testing blade of claim 10, further comprising wherein the output of the potentiometer is provided to an OpAmp to generate the amplitude control signal.

12. The testing blade of claim 5, further comprising an integrator/ramp generator and peak detector in series with an analog-to-digital converter for receiving one of the at least two second clock signals and for generating the value indicative of the frequency of the at least two second clock signals.

13. The testing blade of claim 9, further comprising a peak detector in series with an analog-to-digital converter for receiving one of the at least two second clock signals and for generating the value indicative of the amplitude of the at least two second clock signals.

14. A method of operating a bladed server, comprising:
receiving a signal at a testing blade coupled to the bladed server, wherein the signal is indicative of a desired frequency of a clock signal for use by the bladed server that is different than a nominal clock signal frequency for use by the bladed server;
generating an output clock signal at the testing blade having a frequency;
sensing the frequency of the output clock signal;
generating a value indicative of the sensed frequency;
comparing the value indicative of the sensed frequency with a value indicative of a desired frequency;
modifying, as needed, the frequency of the output clock signal in response to the comparison of the value indicative of the sensed frequency with the value indicative of a desired frequency.

15. The method of claim 14, further comprising:
providing the output clock signal to one or more server blades of the bladed server.

16. The method of claim 15, further comprising:
providing the output clock signal to one or more server blades external the bladed server.

17. The method of claim 14, further comprising:
providing the output clock signal to one or more server blades external the bladed server.

18. The method of claim 14, further comprising receiving additional signals indicative of multiple desired frequencies.

19. The method of claim 18, wherein receiving additional signals indicative of multiple desired frequencies further comprises receiving data indicative of an initial value for the desired frequency, data indicative of an end value for the desired frequency and data indicative of incremental changes in the desired frequency between the initial value and the end value.

20. The method of claim 14, further comprising:
repeating the method for a variety of desired frequencies.

21. The method of claim 14, further comprising:
sensing an amplitude of the output clock signal;
generating a value indicative of the sensed amplitude;
comparing the value indicative of the sensed amplitude with a value indicative of a desired amplitude;
modifying, as needed, the amplitude of the output clock signal in response to the comparison of the value indicative of the sensed amplitude with the value indicative of a desired amplitude.

22. The method of claim 21, further comprising receiving additional signals indicative of multiple desired amplitudes.

23. The method of claim 22, wherein receiving additional signals indicative of multiple desired amplitudes further comprises receiving data indicative of an initial value for the desired amplitude, data indicative of an end value for the desired amplitude and data indicative of incremental changes in the desired amplitude between the initial value and the end value.

24. The method of claim 21, further comprising:
repeating the method for a variety of desired amplitudes.

25. A blade for a bladed server, comprising:
a memory for storing a value indicative of a desired frequency of an output clock signal;

a processor adapted to compare a value indicative of a frequency of an output clock signal to the value indicative of the desired frequency of the output clock signal, wherein the processor is further adapted to generate a first digital control signal in response to the comparison;

a first digital potentiometer responsive to the first digital control signal to generate a first analog control signal;

a voltage-controlled oscillator for generating an intermediate clock signal in response to the first analog control signal, the intermediate clock signal having a frequency and an amplitude;

a clock driver for generating an output clock signal having the frequency of the intermediate clock signal and having an amplitude;

an integrator/ramp generator for receiving the output clock signal as an input;

a first peak detector for receiving an output of the integrator/ramp generator as an input;

a first analog-to-digital converter for receiving the output of the integrator/ramp generator as an input and providing its output to the processor as the value indicative of the frequency of the output clock signal.

26. The blade for a bladed server of claim 25, further comprising an OpAmp coupled between the first digital potentiometer and the voltage-controlled oscillator.

27. The blade for a bladed server of claim 25, further comprising:

a second digital potentiometer responsive to a second digital control signal to generate a second analog control signal;

wherein the clock driver is adapted to generate the amplitude of the output clock signal in response to the second analog control signal; and wherein the processor further adapted to compare a value indicative of the amplitude of the output clock signal to a value indicative of a desired amplitude of the output clock signal and to generate the second digital control signal in response to the comparison.

28. The blade for a bladed server of claim 27, further comprising:

a second peak detector for receiving the output clock signal as an input;

a second analog-to-digital converter for receiving the output of the second peak detector as an input and providing its output to the processor as the value indicative of the amplitude of the output clock signal.

29. The blade for a bladed server of claim 28, wherein the first and second analog-to-digital converters are a single multiplexed analog-to-digital converter.

30. The blade for a bladed server of claim 27, further comprising an OpAmp coupled between the second digital potentiometer and the clock driver.

31. A frequency margin testing blade, comprising:

a connector for coupling the testing blade to a backplane of a bladed server;

a clock driver for generating a clock signal having a frequency a port for providing the clock signal to an external device;

a first sensing circuit for sensing the frequency of the clock signal;

a processor coupled to the backplane adapted for comparing the frequency sensed by the sensing circuit with a value indicative of a desired frequency; and a first control signal generation circuit coupled to the processor for generating a first control signal in response to the comparison of the frequency;

wherein the clock driver is responsive to the first control signal to adjust the frequency of the clock signal.

32. The testing blade of claim 31, further comprising:

a second sensing circuit for sensing an amplitude of the clock signal;

a second control signal generation circuit coupled to the processor;

wherein the processor is further adapted for comparing the amplitude sensed by the second sensing circuit with a value indicative of a desired amplitude;

wherein the second control signal generation circuit is adapted for generating a second control signal in response to the comparison of the amplitude; and wherein the clock driver is responsive to the second control signal to adjust the amplitude of the clock signal.

33. The testing blade of claim 31, wherein the connector is an industry-standard form factor for the connection and communication of computer devices.

34. The testing blade of claim 31, wherein the industry-standard form factor is a compact PCI connector.

35. The testing blade of claim 31, wherein the first sensing circuit comprises an integrator/ramp generator in series with a peak detector.

36. The testing blade of claim 31, wherein the second sensing circuit comprises a peak detector.

37. The testing blade of claim 31, wherein the first control signal generation circuit comprises:

a potentiometer coupled to receive an output of the processor;

a frequency OpAmp coupled to receive an output of the potentiometer; and an oscillator coupled to receive an output of the frequency OpAmp and a reference clock;

wherein the output of the oscillator provides the first control signal.

38. The testing blade of claim 32, wherein the second control signal generation circuit comprises:

a potentiometer coupled to receive an output of the processor; and an amplitude OpAmp coupled to receive an output of the potentiometer;

wherein the output of the amplitude OpAmp provides the second control signal.

39. A bladed server, comprising:

a chassis having a backplane;

at least one server blade coupled to the backplane for providing server functionality; and a frequency margin testing blade coupled to the backplane, wherein the frequency margin testing blade comprises:

means for coupling the testing blade to the backplane of the bladed server;

means for generating a clock signal having a frequency;

means for providing the clock signal to the at least one server blade;

means for sensing the frequency of the clock signal;

means for comparing the frequency sensed by the means for sensing the frequency of the clock signal with a value indicative of a desired frequency; and means for modifying the frequency of the clock signal if the frequency sensed by the means for sensing the frequency of the clock signal differs from the desired frequency.

40. The bladed server of claim 39, further comprising:

means for sensing an amplitude of the clock signal;

means for comparing the amplitude sensed by the means for sensing the amplitude of the clock signal with a value indicative of a desired amplitude; and means for modifying the amplitude of the clock signal if the amplitude sensed by the means for sensing the amplitude of the clock signal differs from the desired amplitude.

41. A bladed server, comprising:

a chassis having a backplane;

at least one server blade coupled to the backplane for providing server functionality; and a frequency margin testing blade coupled to the backplane, wherein the frequency margin testing blade comprises:

- a connector for coupling the testing blade to the backplane of the bladed server;
- a clock driver for generating a clock signal having a frequency;
- at least one port for providing the clock signal to the at least one server blade;
- a first sensing circuit for sensing the frequency of the clock signal;
- a processor coupled to the backplane adapted for comparing the frequency sensed by the sensing circuit with a value indicative of a desired frequency; and
- a first control signal generation circuit coupled to the processor for generating a first control signal in response to the comparison of the frequency;
- wherein the clock driver is responsive to the first control signal to adjust the frequency of the clock signal.

42. The bladed server of claim 41, wherein the frequency margin testing blade further comprises:

a second sensing circuit for sensing an amplitude of the clock signal;

a second control signal generation circuit coupled to the processor;

wherein the processor is further adapted for comparing the amplitude sensed by the second sensing circuit with a value indicative of a desired amplitude;

wherein the second control signal generation circuit is adapted for generating a second control signal in response to the comparison of the amplitude; and wherein the clock driver is responsive to the second control signal to adjust the amplitude of the clock signal.

43. A method of operating a bladed server, comprising:

invoking a testing blade of the bladed server through a test executive;

receiving commands and data at the testing blade from the test executive to instruct the testing blade to adjust the frequency of output clock signals for testing of the bladed server or individual server blades of the bladed server at operating clock frequencies that are lower or higher than nominal conditions;

varying the frequency of the output clock signals in response to the commands and data received from the test executive; and gathering information related to the operation of the bladed server at the varied output clock signal frequencies.

44. The method of claim 43, further comprising:

varying the amplitude of the output clock signals in response to the commands and data received from the test executive; and gathering information related to the operation of the bladed server at the varied output clock signal frequencies;

wherein the commands and data received at the testing blade from the test executive further instruct the testing blade to adjust the amplitude of the output clock signals for testing of the bladed server or individual server blades of the bladed server at operating clock amplitudes that are lower or higher than nominal conditions.

\* \* \* \* \*